US007280826B2

(12) United States Patent
Nylander et al.

(10) Patent No.: US 7,280,826 B2
(45) Date of Patent: *Oct. 9, 2007

(54) METHOD, SYSTEM AND APPARATUS FOR PROVIDING SECURITY IN AN UNLICENSED MOBILE ACCESS NETWORK OR A GENERIC ACCESS NETWORK

(75) Inventors: Tomas Nylander, Stavsnäs (SE); Jari Tapio Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 109 days.

This patent is subject to a terminal disclaimer.

(21) Appl. No.: 11/047,880

(22) Filed: Feb. 1, 2005

(65) Prior Publication Data
US 2006/0172732 A1 Aug. 3, 2006

(51) Int. Cl.
*H04Q 7/20* (2006.01)
(52) U.S. Cl. .................. 455/433; 455/410; 455/411; 455/435.1; 455/436; 455/437; 455/438; 455/466; 370/331; 370/338
(58) Field of Classification Search ............... 455/410, 455/411, 435.1–435.3, 433, 41.2, 436–444; 370/331, 338
See application file for complete search history.

(56) References Cited

U.S. PATENT DOCUMENTS

| 5,850,444 | A * | 12/1998 | Rune ........................... 705/79 |
| 6,647,426 | B2 * | 11/2003 | Mohammed ................. 709/238 |
| 6,922,559 | B2 * | 7/2005 | Mohammed ................. 455/421 |
| 6,925,074 | B1 * | 8/2005 | Vikberg et al. .............. 370/338 |
| 2003/0065952 | A1 | 4/2003 | Otsuka |
| 2003/0115261 | A1 * | 6/2003 | Mohammed ................. 709/203 |
| 2003/0119548 | A1 * | 6/2003 | Mohammed ................. 455/552 |
| 2003/0233461 | A1 * | 12/2003 | Mariblanca-Nieves et al. ........................... 709/228 |
| 2004/0090937 | A1 * | 5/2004 | Chaskar et al. ............. 370/331 |
| 2004/0248593 | A1 * | 12/2004 | Hicks et al. ................ 455/462 |
| 2006/0045057 | A1 * | 3/2006 | Nylander et al. ........... 370/338 |

OTHER PUBLICATIONS

European Telecommunications Standards Institute ETSI TS 143 318 "Digital cellular telecommunications system (Phase 2+); Generic access to the A/Gb interface; Stage 2" (3GPP TS 43.318 version 6.0.0 Release 6), Jan. 2005, vol. 3 G1, No. V600, XP014028301 ISSN: 0000-0001.

* cited by examiner

*Primary Examiner*—Steve M. D'Agosta

(57) ABSTRACT

The present invention provides a method, system and apparatus for providing security in an unlicensed mobile access network or a generic access network by receiving a message containing a mobile identity of a mobile station (MS) and dropping or rejecting the message whenever the received mobile identity does not match a stored mobile identity associated with the MS. The message is processed whenever the received mobile identity matches the stored mobile identity associated with the MS. The stored mobile identity is provided by a secure gateway. The mobile identity can be an International Mobile Subscriber Identity, Temporary Mobile Subscriber Identity, Packet Temporary Mobile Subscriber Identity, private Internet Protocol (IP) address or public IP address. The message can be a registration request, uplink message or a downlink message, such as a Mobility Management message, a General Packet Radio Service Mobility Management message, or a UMA or Unlicensed Radio Resources message.

16 Claims, 10 Drawing Sheets

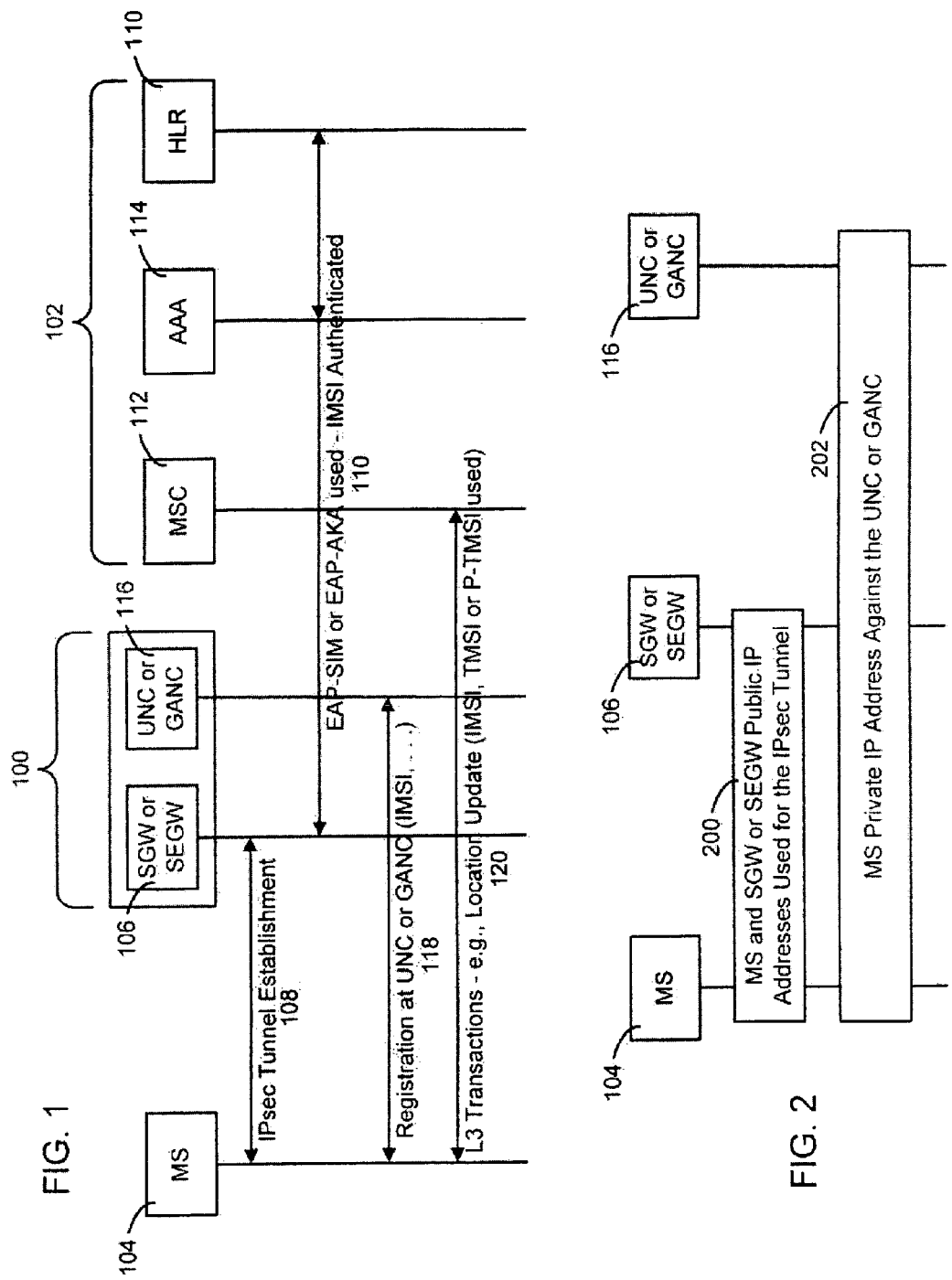

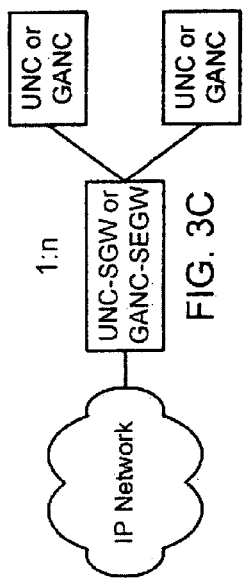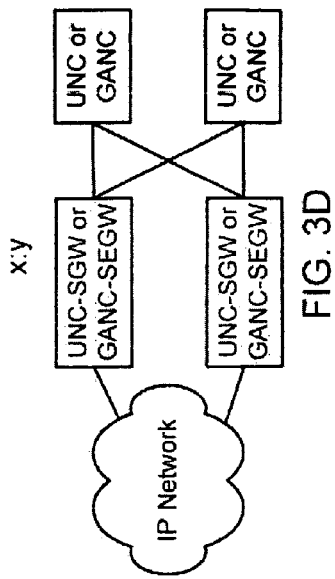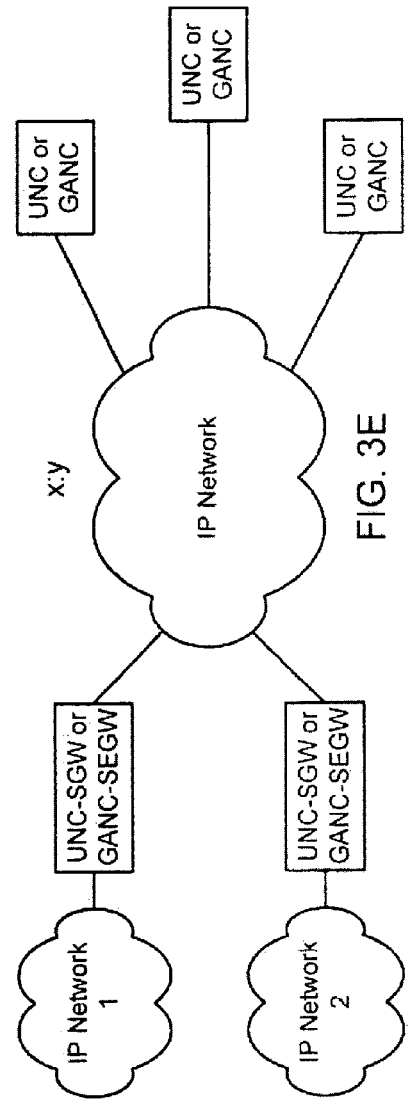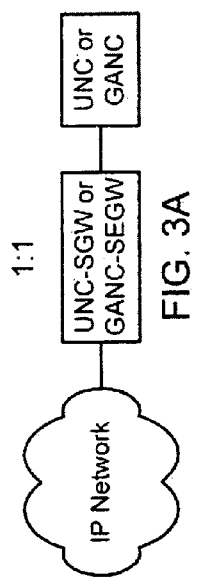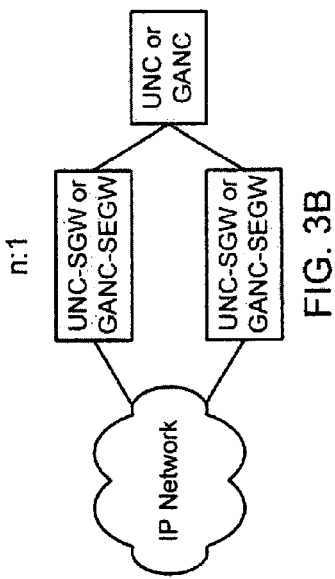

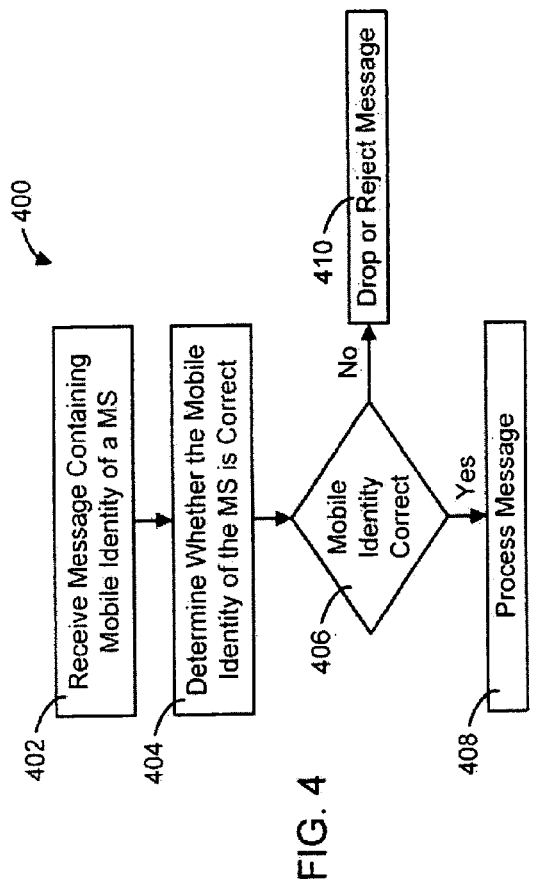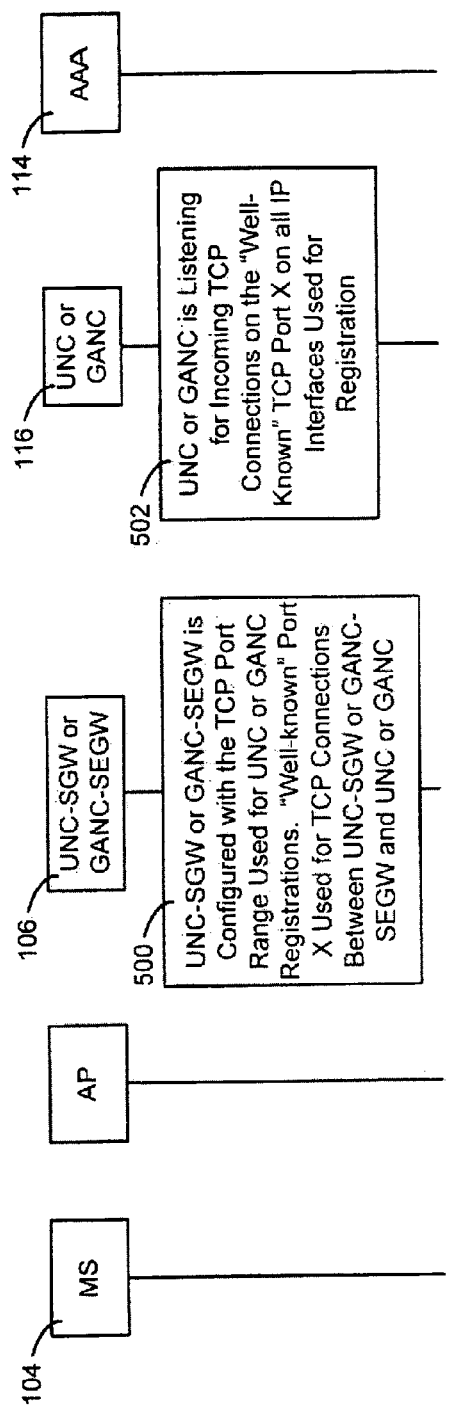

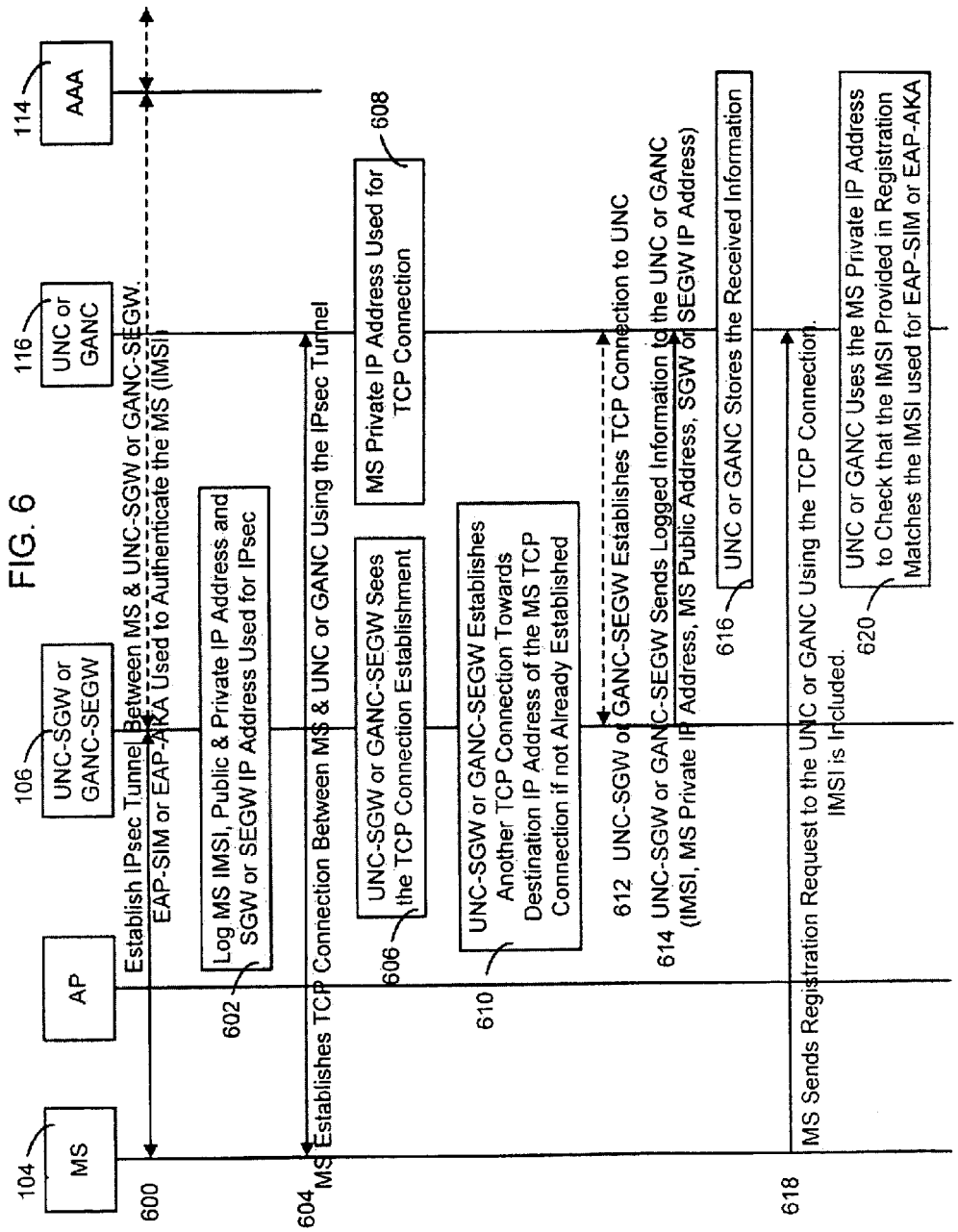

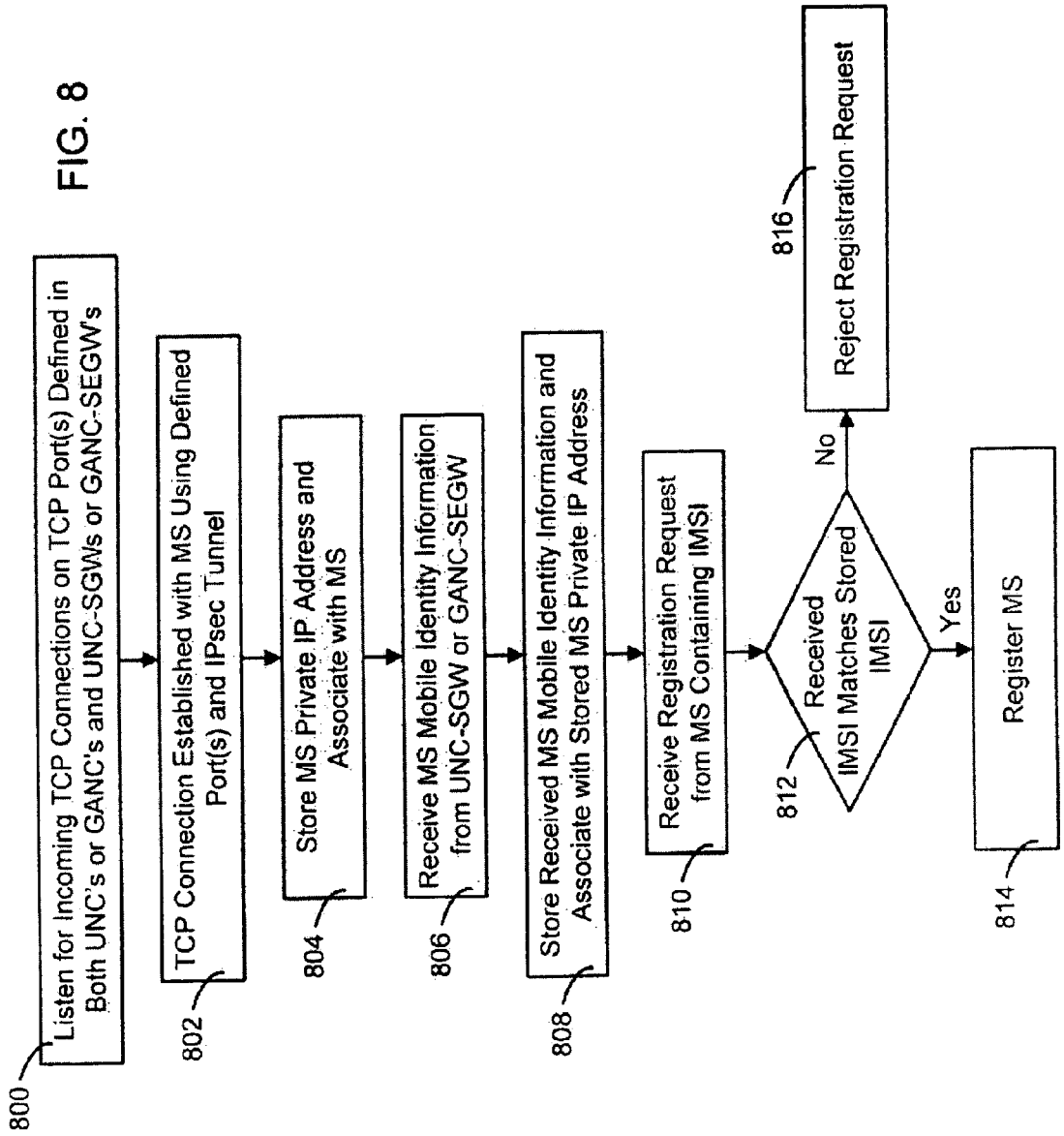

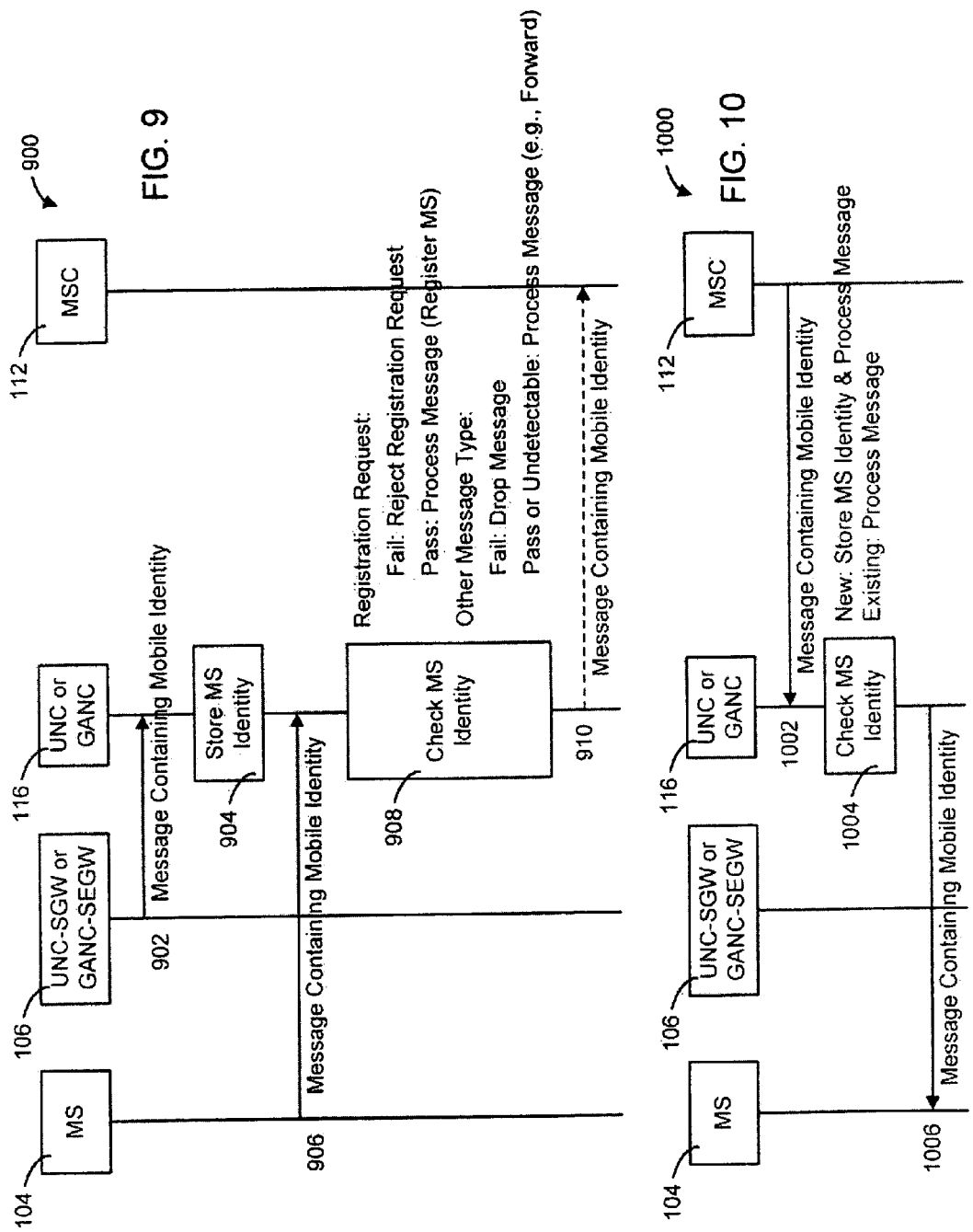

METHOD, SYSTEM AND APPARATUS FOR PROVIDING SECURITY IN AN UNLICENSED MOBILE ACCESS NETWORK OR A GENERIC ACCESS NETWORK

FIELD OF THE INVENTION

The present invention relates in general to the field of mobile communications and, more particularly, to a method, system and apparatus for providing security in an unlicensed mobile access network or a generic access network.

BACKGROUND OF THE INVENTION

The unlicensed mobile access (UMA) specifications recommend that the unlicensed network controller (UNC) and the unlicensed network controller secure gateway (UNC-SGW) should check that the same International Mobile Subscriber Identity (IMSI) is used when a mobile station (MS) establishes the IPsec secure connection towards the UNC-SGW and when the MS registers at the UNC. In both these instances, the MS provides the IMSI to the UNC-SGW and UNC, respectively. The UMA specifications do not, however, define how these checks should be made. Yet, the implementation of these recommendations still leaves the core network open to attacks.

This is also the case in the 3d Generation Partnership Project (3GPP) standards for "Generic Access to A and Gb-interface", otherwise known as a Generic Access Network (GAN). See 3GPP Technical Specifications 43.318 (Stage-2) and 44.318 (Stage 3). Note that the generic access network controller (GANC) in the 3GPP specifications is equivalent to the UNC in the UMA specifications. Similarly, the generic access network controller secure gateway (GANC-SEGW) in the 3GPP specifications is equivalent to the UNC-SGW in the UMA specifications.

For example, a MS could use multiple Temporary Mobile Subscriber Identities (TMSI) or Packet Temporary Mobile Subscriber Identities (P-TMSI) to emulate multiple MSs, such as a personal computer (PC) with a SIM-card reader and a UMA client. Moreover, a hostile MS could send Location Updates or IMSI Detach messages towards the core network causing a type of denial-of-service (DoS) attack on the MS-level (terminating calls would fail, etc.). Accordingly, there is a need for a method and apparatus that protects the core network by checking the mobile identities (IMSI, TMSI and/or P-TMSI) used by mobile stations when they communicate with the core network.

SUMMARY OF THE INVENTION

The present invention provides a method, system and apparatus that performs the recommended security checks by the unlicensed network controller (UNC) or the generic access network controller (GANC) and the secure gateway for the unlicensed network controller (UNC-SGW) or the generic access network controller (GANC-SEGW). The present invention provides an optimized solution that minimizes the O&M activities needed, supports for many different network scenarios and can be easily standardized. Note that the present invention is applicable to both unlicensed mobile access networks (UMAN) and generic access networks (GAN).

More specifically, the present invention introduces a new protocol between the UNC and the UNC-SGW or the GANC and the GANC-SEGW based on reliable transmission that in includes dynamic handling of the connections between UNC-SGWs and UNCs or the GANC-SEGWs and GANCs. In essence, the UNC-SGW or GANC-SEGW saves some data at IPsec tunnel establishment and checks the communication between the MS and the UNC and GANC. When a TCP connection is established between a MS and an UNC or GANC, the UNC-SGW or GANC-SEGW can establish another TCP connection towards that UNC or GANC and send the needed information only to that UNC or GANC. The UNC or GANC can then check that the information used at IPsec tunnel establishment (EAP-SIM or EAP-AKA authentication) and at registration are the same. The present invention also provides the added benefit that the public IP address for the MS is provided to the UNC or GANC.

In addition, the present invention can be used to protect the core network by checking the mobile identities (International Mobile Subscriber Identity (IMSI), Temporary Mobile Subscriber Identity (TMSI) and/or Packet Temporary Mobile Subscriber Identity (P-TMSI)) used by mobile stations (MS) when they communicate with the core network. Simply stated, messages that contain a mobile identifier which does not correspond to a stored mobile identifier associated with the MS (after registration) are dropped. Once such a message is dropped, various preventive and reporting actions can be taken. The MS is, therefore, only permitted to use one IMSI, one TMSI and one P-TMSI. As a result, the present invention protects the core network from malicious and faulty MS implementations.

As a result, the present invention also provides a method for providing security in an unlicensed mobile access network by receiving a message containing a mobile identity of a MS and dropping or rejecting the message whenever the received mobile identity does not match a stored mobile identity associated with the MS. The message is processed whenever the received mobile identity matches the stored mobile identity associated with the MS. The mobile identity can be an IMSI, a TMSI, a P-TMSI, a private Internet Protocol (IP) address or a public IP address. The message can be a registration request, an uplink message or a downlink message, such as a Mobility Management (MM) message, a General Packet Radio Service (GPRS) Mobility Management (GMM) message, or a UMA or Unlicensed Radio Resources (URR) message (only used between MS and UNC). The present invention can be implemented as a computer program embodied on a computer readable medium wherein the various method steps are implemented by one or more code segments.

In addition, the present invention provides an apparatus that includes a data storage device communicably coupled to a processor. The data storage device stores associations of mobile identities to MSs. The processor receives a message containing a mobile identity of a MS and drops or rejects the message whenever the received mobile identity does not match a stored mobile identity associated with the MS. The apparatus is typically an unlicensed network controller (UNC) within an unlicensed mobile access network (UMAN) or a generic access network controller (GANC) within a generic access network (GAN) that is in communication with the core network.

The present invention also provides a system that includes a mobile station, a secure gateway and an unlicensed network controller. The secure gateway is communicably coupled to the mobile station. The unlicensed network controller is communicably coupled to the mobile station and the secure gateway. The secure gateway receives mobile identity information from the mobile station and sends the mobile identity information to an unlicensed network controller. The unlicensed network controller stores the received mobile identity information and registers the mobile station whenever a mobile identity within a registration request received from the mobile station matches the stored mobile identity information. The secure gateway is configured with one or more defined Transmission Control Protocol (TCP) ports used by the unlicensed network controller to register the mobile station, and the unlicensed network controller listens for an incoming TCP connection on the one or more defined TCP ports. In one embodiment, the secure gateway ensures that the registration request is not received by the unlicensed network controller until a message is received from the unlicensed network controller indicating successful receipt and storage of the mobile identity information. In another embodiment, the unlicensed network controller uses the mobile identity information to provide one or more services to the mobile station. As previously mentioned, the unlicensed network controller can be a generic access network controller.

BRIEF DESCRIPTION OF THE DRAWINGS

The above and further advantages of the invention may be better understood by referring to the following description in conjunction with the accompanying drawings, in which:

FIG. 1 is a representative signaling sequence depicting the use of mobile identities between a UMA network and a core network;

FIG. 2 is a diagram depicting the different IP addresses used by a mobile station;

FIGS. 3A, 3B, 3C, 3D and 3E are block diagrams depicting different network scenarios of the relationship between unlicensed network controllers and secure gateways for unlicensed network controllers in which the present invention can be used;

FIG. 4 is a flow chart depicting a method of protecting a core network in accordance with the present invention;

FIG. 5 is a diagram depicting an initial configuration for one embodiment of the present invention;

FIG. 6 is a signaling sequence depicting the use of one embodiment of the present invention;

FIG. 8 is a flow chart depicting a method in accordance with one embodiment of the present invention as it used at an unlicensed network controller;

FIG. 9 is a signaling sequence depicting the use of one embodiment of the present invention with respect to uplink messages;

FIG. 10 is a signaling sequence depicting the use of one embodiment of the present invention with respect to downlink messages;

DETAILED DESCRIPTION OF THE INVENTION

Figure 7A:
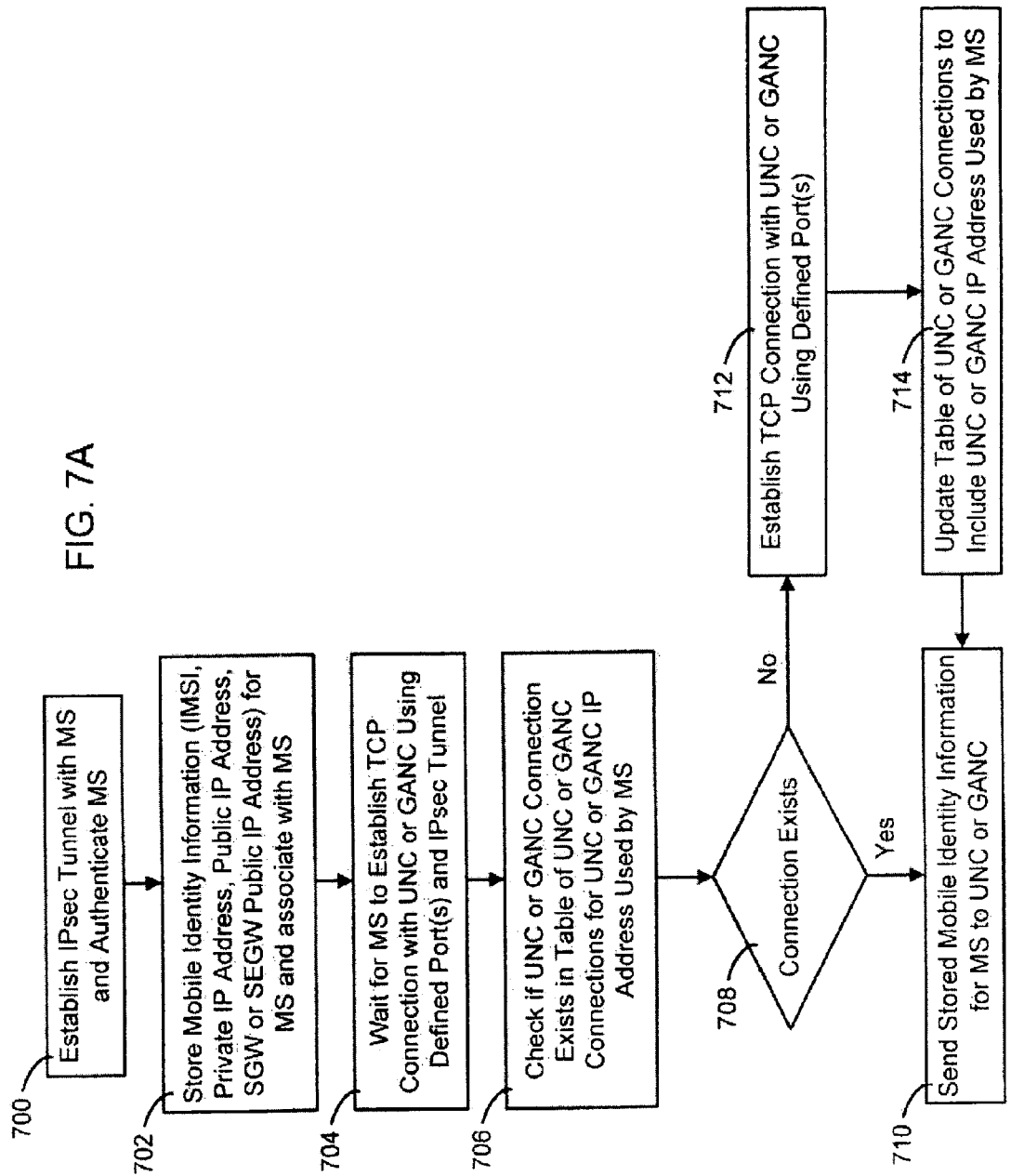
FIGS. 7A, 7B and 7C are flow charts depicting a method in accordance with one embodiment of the present invention as it used at a secure gateway for an unlicensed network controller.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a method, system and apparatus that performs the recommended security checks by the unlicensed network controller (UNC) or the generic access network controller (GANC) and the secure gateway for the unlicensed network controller (UNC-SGW) or the generic access network controller (GANC-SEGW). The present invention provides an optimized solution that minimizes the O&M activities needed, supports for many different network scenarios and can be easily standardized. Note that the present invention is applicable to both unlicensed mobile access networks (UMAN) and generic access networks (GAN).

More specifically, the present invention introduces a new protocol between the UNC and the UNC-SGW or the GANC and the GANC-SEGW based on reliable transmission that in includes dynamic handling of the connections between UNC-SGWs and UNCs or the GANC-SEGWs and GANCs. In essence, the UNC-SGW or GANC-SEGW saves some data at IPsec tunnel establishment and checks the communication between the MS and the UNC and GANC. When a TCP connection is established between a MS and an UNC or GANC, the UNC-SGW or GANC-SEGW can establish another TCP connection towards that UNC or GANC and send the needed information only to that UNC or GANC. The UNC or GANC can then check that the information used at IPsec tunnel establishment (EAP-SIM or EAP-AKA authentication) and at registration are the same. The present invention also provides the added benefit that the public IP address for the MS is provided to the UNC or GANC.

In addition, the present invention can be used to protect the core network by checking the mobile identities (International Mobile Subscriber Identity (IMSI), Temporary Mobile Subscriber Identity (TMSI) and/or Packet Temporary Mobile Subscriber Identity (P-TMSI)) used by mobile stations (MS) when they communicate with the core network. Simply stated, messages that contain a mobile identifier which does not correspond to a stored mobile identifier associated with the MS (after registration) are dropped. Once such a message is dropped, various preventive and reporting actions can be taken. The MS is, therefore, only permitted to use one IMSI, one TMSI and one P-TMSI. As a result, the present invention protects the core network from malicious and faulty MS implementations.

Now referring to FIG. 1, a representative signaling sequence depicting the use of mobile identities between a UMA network or a generic access network (GAN) 100 and a core network 102 is shown. The MS 104 provides the IMSI to the secure gateway of the unlicensed network controller (UNC-SGW) or generic access network controller (GANC-SEGW) 106 using EAP-SIM or EAP-AKA when the MS 104 establishes the IPsec secure connection 108 towards the UNC-SGW or GANC-SEGW 106. The UNC-SGW or GANC-SEGW 106 authenticates 110 this IMSI in the HLR 110 using well known signaling and authentication protocols (authentication, authorization and accounting (AAA) infrastructure 114). The MS 104 also provides the IMSI to the unlicensed network controller (UNC) or generic access controller (GANC) 116 when the MS 104 registers 118 with the UNC or GANC 116. In addition, the MS 104 uses IMSI, TMSI or P-TMSI to identify itself when the MS 104 communicates 120 with the core network 102 (e.g., MSC 112).

Note that the TMSI and P-TMSI are not reported to the UNC or GANC 116 when registering 118. The TMSI and P-TMSI have significance only within a location area. Outside the location area, the TMSI and P-TMSI have to be combined with the Location Area Identifier (LAI) to provide for an unambiguous identity. Usually the TMSI or P-TMSI reallocations are performed at least at each change of a location area. Such choices are left to the network operator.

Mobile identity is used in the following Mobility Management (MM) messages between the MS 104 and the MSC/Visiting Location Register (VLR) 112.

From the MS 104 to the MSC/VLR 112 (uplink messages):
  LOCATION UPDATING REQUEST
  IDENTITY RESPONSE
  CM SERVICE REQUEST
  IMSI DETACH INDICATION
  CM RE-ESTABLISHMENT REQUEST From the MSC/VLR 112 to the MS 104 (downlink messages):
  TMSI REALLOCATION COMMAND
  LOCATION UPDATING ACCEPT Mobile identity is also used in the PAGING RESPONSE message from the MS 104 to the MSC/VLR 112. The UNC or GANC 116 can, therefore, perform checks on MM-messages sent between the MS 104 and the MSC/VLR 112.

Referring now to FIG. 2, a diagram depicting the different IP addresses used by a mobile station 104 is shown. As previously mentioned, the present invention solves the problem of getting the MS 104 public IP-address to the UNC or GANC 116. Some operators will have a managed IP network and will have control of the public IP addresses assigned to their customers (e.g., to the cable TV modem) so that they can prioritize voice traffic in their networks. The public IP-address can also be used for location services and charging (like HomeZone). The public (i.e., outer) IP-address(es) 200 are only used between the MS 104 and the UNC-SGW or GANC-SEGW 106 and are not visible in the UNC or GANC 116. MS 104 uses a private (i.e., inner) IP-address 202 in the communication with the UNC or GANC 116.

The UNC or GANC 116 needs to find out the MS 104 public IP-address 200 in order to provide quality-of-service (QoS), location services, charging, etc. For example, the UNC or GANC 116 can use the received "log" information (MS 104 and UNC-SGW or GANC-SEGW 106 public IP-addresses) (which will be described below) towards a Policy Server (e.g., using COPS) to guarantee QoS in the network(s) between the MS 104 and the UNC-SGW or GANC-SEGW 106. For location services, the UNC or GANC 116 can contact an external server that can return the location information for a public IP-address (e.g., latitude/longitude). This information can then be used against the core network 102 for location services. For charging, the UNC or GANC 116 can contact an external server that can return the location information for a public IP-address to find out if the MS 104 is at home premises (i.e., not in a hot-spot). This information can then be used against the core network 102 for differentiated charging (another CGI is indicated towards the core network 102). This new protocol between the UNC-SGW 106 and UNC 116 or GANC-SEGW 106 and GANC 116 can be used and enhanced for many other purposes as well (e.g., bandwidth management to see if the MS 104 should be redirected to another UNC-SGW or GANC-SEGW 106).

The "UNC or GANC connection" new protocol, as will be described below, can also be used to indicate to the UNC-SGW or GANC-SEGW 106 that the IPsec connection should be disconnected in the no-match case. The UNC or GANC 116 could also notify the AAA-server 114 that the particular IMSI used at EAP-SIM or EAP-AKA was being used for hostile actions and the IMSI could be black-listed (if so desired by the operator). In addition, the "UNC or GANC connection"/new protocol can also be used by the UNC-SGW or GANC-SEGW 106 to indicate to the UNC or GANC 116 that an IPsec connection has been disconnected. This can further be used instead of the application level keep alive mechanism, which relieves the application level from this burden (e.g., the Application level keep alive procedure can use very high intervals).

Now referring to FIGS. 3A, 3B, 3C, 3D and 3E, block diagrams depicting different network scenarios of the relationship between unlicensed network controllers and secure gateways for unlicensed network controllers in which the present invention can be used are shown. In the simplest network scenario case (FIG. 3A), the relationship between UNC-SGW and UNC or GANC-SEGW and GANC is 1:1. In this case, the problem in this solution could be simpler to handle, i.e., each UNC-SGW or GANC-SEGW knows exactly to which UNC or GANC to send the needed information or that each UNC or GANC knows exactly which UNC-SGW or GANC-SEGW to ask for the information. The O&M needed for this scenario is simple. Either the UNC-SGW or GANC-SEGW is configured with the information about the UNC or GANC or the other way around.

In another network scenario case (FIG. 3B), the relationship between UNC-SGWs and UNCs or GANC-SEGWs and GANCs is n:1 (i.e. multiple UNC-SGWs serving one UNC or multiple GANC-SEGWs serving one GANC). In this case, the problem in this solution is still quite simple to handle, i.e., each UNC-SGW or GANC-SEGW knows exactly to which UNCs or GANCs to send the needed information or that each UNC or GANC knows exactly which UNC-SGW or GANC-SEGW to ask for the information. O&M needed for this scenario is complex. Either the UNC-SGWs or GANC-SEGWs are configured with the information about the UNC or GANC or that the UNC or GANC is configured with the information about all UNC-SGWs or GANC-SEGWs.

In yet another network scenario case (FIG. 3C), the relationship between UNC-SGW and UNC or GANC-SEGW and GANC is 1:n (i.e., one UNC-SGW serving for multiple UNCs or one GANC-SEGW serving for multiple GANCs). In this case, the problem in this solution is still quite simple to handle, i.e., each UNC-SGW or GANC-SEGW knows exactly to which UNCs or GANCs to send the needed information or that each UNC or GANC knows exactly which UNC-SGW or GANC-SEGW to ask for the information. The O&M needed for this scenario is quite complex. Either the UNC-SGW or GANC-SEGW is configured with the information about all the UNCs or GANCs or that each UNC or GANC is configured with the information about the UNC-SGW or GANC-SEGW.

In the most complex network scenario case (FIGS. 3D and 3E), the relationship between UNC-SGWs and UNCs or GANC-SEGWs and GANCs is x:y (i.e. multiple UNC-SGWs serving multiple UNCs or multiple GANC-SEGWs serving multiple GANCs). In this case, the problem in this solution is not simple to handle, i.e., each UNC-SGW or GANC-SEGW should know to which UNCs or GANCs to send the needed information or that each UNC or GANC should know all the possible UNC-SGWs or GANC-SEGWs to ask for the information. O&M needed for this scenario is complex. Either the UNC-SGWs or GANC-SEGWs are configured with the information about all the UNCs or GANCs, or that all UNCs or GANCs are configured with the information about all UNC-SGWs or GANC-SEGWs. The present invention addresses and solves all of these scenarios.

Referring now to FIG. 4, a flow chart depicting a method 400 of protecting a core network 102 in accordance with the present invention is shown. The UNC or GANC 116 receives a message containing a mobile identity of a MS 104 in block 402. The UNC or GANC 116 then determines whether the received mobile identity is correct by comparing it to a stored mobile identity that is associated with the MS 104 in block 404. If the received mobile identity is correct, as determined in decision block 406, the received message is processed (e.g., forwarded, etc.) in block 408. If, however, the received mobile identity is not correct, as determined in decision block 406, the received message is either dropped or rejected in block 410. The mobile identity can be an IMSI, TMSI or a P-TMSI. The received message can be a registration request, an uplink message or a downlink message, such as a Mobility Management (MM) message, a General Packet Radio Service (GPRS) Mobility Management (GMM) message, or a UMA or Unlicensed Radio Resources (URR) message (only used between MS 104 and UNC 116).

The UNC or GANC 116 determines whether the mobile identity of the MS 104 is correct by performing a layer violation, i.e., sneaking into the upper layer messages sent by the MS 104 towards the core network 102 to see if the MS 104 is using the same IMSI as it used for registering with the UNC or GANC 116. Since the TMSI value is assigned by the MSC/VLR 112 and the P-TMSI is assigned by the SGSN, the UNC or GANC 116 can check that the MS 104 is using the value assigned by the MSC 112. This can again be performed by checking the upper layer downlink messages sent by the core network 102, to see which TMSI value or P-TMSI value is assigned to the MS 104 and then by checking the upper layer uplink messages that the MS 104 is really using the assigned TMSI value or P-TMSI value.

The present invention can be implemented as an apparatus, such as UNC or GANC 116, that includes a data storage device communicably coupled to a processor. The data storage device stores associations of mobile identities to MSs 104. The processor receives a message 402 containing a mobile identity of a MS 104 and drops or rejects the message 410 whenever the received mobile identity does not match a stored mobile identity associated with the MS 104. The processor can be a pre-processor, filter or other processing device within the apparatus. The data storage device can be a memory, disk drive, hard drive, etc.

Now referring to FIG. 5, a diagram depicting an initial configuration for one embodiment of the present invention is shown. As shown in block 502, each UNC or GANC 116 is listening for incoming TCP connections on a well-known TCP port. Well-known means that it is a TCP port number defined both in the UNCs or GANCs 116 and in the UNC-SGWs or GANC-SEGWs 106. In addition, each UNC-SGW or GANC-SEGW 106 is configured with the needed TCP port range(s) used for MS 104 registrations towards the UNCs or GANCs 116 in block 500. Binding between UNC-SGWs or GANC-SEGWs 106 and UNCs or GANCs 116 is not required.

Referring now to FIG. 6, a signaling sequence depicting the use of one embodiment of the present invention is shown. An IPsec tunnel is established between the MS 104 and the UNC-SGW or GANC-SEGW 106 and EAP-SIM or EAP-AKA is used to authenticate the MS 104 (MS IMSI is authenticated) via message exchange 600. The UNC-SGW or GANC-SEGW 106 "logs" the MS "public" and "private" IP addresses, UNC-SGW or GANC-SEGW public IP address and identification used in the EAP-SIM or EAP-AKA authentication (i.e., the MS IMSI) in block 602. This information is stored in a MS 104 context and kept during the life-time of the IPsec tunnel. A TCP connection towards one of the UNC or GANC registration ports (e.g., in TCP port range 14001-14010) is established successfully (i.e., the 3 way TCP hand-shake performed) using the IPsec tunnel via message exchange 604.

The UNC-SGW or GANC-SEGW 106 sees that the TCP-connection is established successfully towards a UNC or GANC IP-address (i.e., UNC/GANC-IP1 below) in block 606. The UNC or GANC 116 sees the MS private IP-address and can store it in the MS-context for use in block 616. A MS context is created for this MS 104. The UNC-SGW or GANC-SEGW 106 takes the destination IP address used for the TCP connection (i.e., UNC/GANC-IP1) and checks if no "UNC or GANC connection" exists to this IP address in the table of "UNC or GANC connections" in block 610. The UNC-SGW or GANC-SEGW 106 dynamically builds a table with UNC or GANC IP addresses, that is consulted when a TCP connection is established in an IPsec tunnel, so if the UNC SGW or GANC-SEGW 106 already has a TCP connection to the UNC or GANC IP interface, that TCP is used to send the "log" information. If no TCP-connection exists towards UNC/GANC-IP1, the UNC-SGW or GANC-SEGW 106 establishes a TCP connection to the UNC or GANC 116 on the well-known "UNC or GANC log" port (e.g., TCP port 14500) and updates its table of UNC or GANC connections in message exchange 612. No action is required if a TCP connection already exists towards UNC/GANC-IP1.

When the UNC or GANC TCP connection has been established, the UNC-SGW or GANC-SEGW 106 sends the "log" information about the IPsec tunnel establishment to the UNC or GANC 116 in message 614. This information, which is also referred to as mobile identity information, includes:

MS IMSI
MS private IP-address
MS public IP-address
SGW or GANC public IP-address The UNC or GANC 116 stores the received "log" information using the MS private IP-address as the key to find the right MS context in block 616. The MS 104 sends a registration request to the UNC or GANC 116 (e.g., URR REGISTER REQUEST message containing IMSI among other information to UNC 116) in message 618.

The UNC or GANC 116 can check that the IMSI included in this message is the one as received from the UNC-SGW or GANC-SEGW 106 in message 614 (i.e., the one used in message exchange 600 for EAP-SIM or EAP-AKA authentication). If the IMSI values match, the MS 104 is allowed to register and if not, then the MS registration is rejected and eventually the private IP-address used by the MS 104 is blacklisted for a period of time and an event could be created to alert the operator of the possible attack. Since the same UNC or GANC IP interface is used for both registration and the "log" function, no special care needs to be taken to supervise the connection, neither are any restoration procedures needed. For example, if an IP interface fault in the UNC or GANC occurs, MSs 104 using this interface will have to reregister on another IP interface or on the same IP interface if it recovers and the "log" function will follow the MS 104 to the new IP interface, if not connection already exists. The UNC-SGW or GANC-SEGW 106 will delete the entry in the "UNC or GANC connection" table at detected TCP failure towards a UNC or GANC 116.

Note that steps 604 to 620 can take place multiple times when the IPsec tunnel between the MS 104 and the UNC-SGW 106 is reused towards another UNC 116 (i.e., steps 600 and 602 are performed once and then steps 604 to 620 are performed multiple times). In addition, there is a possible timing issue if the MS registration request (step 618) is received in the UNC 116 before the UNC-SGW 106 (step 614) sends the logged information to the UNC 116. This could happen as a result of high-load on the UNC-SGW 106.

In one solution, the UNC-SGW 106 can queue the registration request message (e.g. all messages on the TCP connection) from the MS 104 (step 618) until it has received an indication that the UNC 116 has successfully received and handled the data (step 614). In another solution, the UNC-SGW or GANC-SEGW 106 can delay the last message to the MS 104 in the TCP connection establishment (step 604, TCP-ACK) until it has received an indication that the UNC or GANC 116 has successfully received and handled the data (step 614). This will also effectively delay the registration request message from the MS 104.

In the above example, the MS private IP-address is used to find the right MS context in the UNC or GANC 116. IMSI (or any combination of logged information in step 614) can be used for this. If IMSI is used, then the actions are modified and following should take place on high level. No MS context is created in the UNC or GANC 116 at step 608. The UNC or GANC 116 stores the logged information in another data structure in step 616, i.e., no MS context exists yet. The MS context is created at step 620, i.e., when the MS registration request is received. After the MS context is created, the UNC or GANC 116 checks the other data structure if it contains information for the IMSI included in the registration request and if found and match, the registration is accepted. Otherwise (i.e., not found or no-match) the MS registration is rejected as defined in step 620 above.

Accordingly, the present invention also provides a system that includes a MS 104, a secure gateway (UNC-SGW or GANC-SEGW) 106 and an UNC or GANC 116. The UNC-SGW or GANC-SEGW 106 is communicably coupled to the MS 104. The UNC or GANC 116 is communicably coupled to the MS 104 and the UNC-SGW or GANC-SEGW 106. The UNC-SGW or GANC-SEGW 106 receives mobile identity information from the MS 104 and sends the mobile identity information to the UNC or GANC 116. The UNC or GANC 116 stores the received mobile identity information and registers the MS 104 whenever a mobile identity within a registration request received from the MS 104 matches the stored mobile identity information. The UNC-SGW or GANC-SEGW 106 is configured with one or more defined Transmission Control Protocol (TCP) ports used by the UNC or GANC 116 to register the MS 104, and the UNC or GANC 116 listens for an incoming TCP connection on the one or more defined TCP ports. In one embodiment, the UNC-SGW or GANC-SEGW 106 ensures that the registration request is not received by the UNC or GANC 116 until a message is received from the UNC or GANC 116 indicating successful receipt and storage of the mobile identity information. In another embodiment, the UNC or GANC 116 uses the mobile identity information to provide one or more services to the MS 104.

Figure 7C:
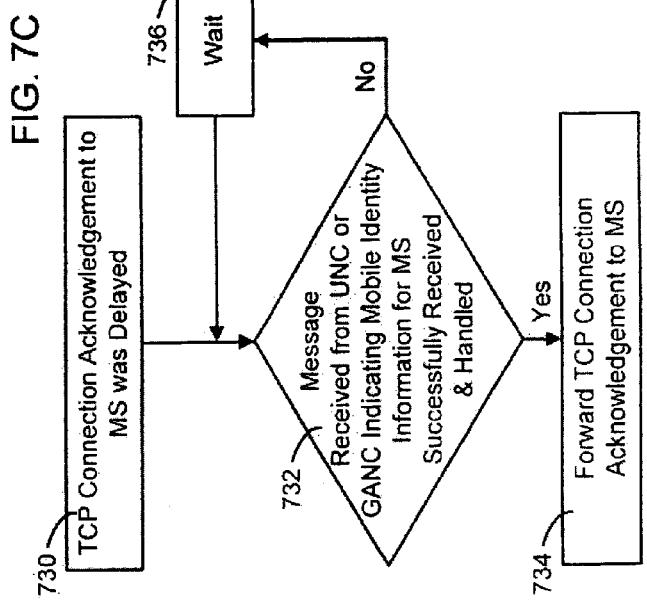
Figure 7B:
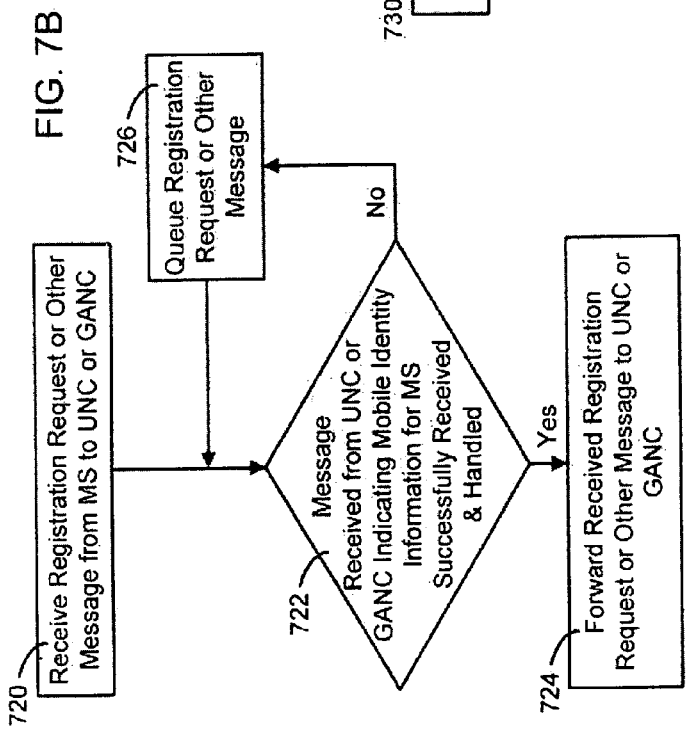

Now referring to FIGS. 7A, 7B and 7C, flow charts depicting a method in accordance with one embodiment of the present invention as it used at a secure gateway (UNC-SGW) 106 for an unlicensed network controller (UNC) 116 are shown. As previously described, the present invention can also be used at a secure gateway (GANC-SEGW) 106 for an generic access network controller (GANC) 116. The IPsec tunnel is established with the MS 104 and the MS 104 is authenticated in block 700. The mobile identity information (MS IMSI, MS private IP address, MS public IP address and SGW public IP address) is stored and associated with the MS 104 in block 702. The process waits for the MS 104 to establish a TCP connection with the UNC 116 using the defined port(s) and IPsec tunnel in block 704. A check is then performed to see if the "UNC Connection" exists in a table of "UNC Connections" for the UNC IP address used by the MS 104 in block 706. If the "UNC Connection" exists, as determined in decision block 708, the mobile identity information for the MS 104 is sent to the UNC 116 in block 710. If, however, the "UNC Connection" does not exist, as determined in decision block 708, a TCP Connection is established with the UNC 116 using the defined port(s) in block 712 and the table of "UNC Connections" is updated to include the UNC IP address used by the MS 104. The mobile identity information for the MS 104 is sent to the UNC 116 in block 710.

As previously discussed, the present invention can provide various mechanisms to ensure that the MS 104 registration request is not received by the UNC 116 until a message is received from the UNC 116 indicating successful receipt and storage of the mobile identity information. For example, if a registration request or other message from the MS 104 to the UNC 116 is detected by the UNC-SGW 106 in block 720 and a message has been received from the UNC 116 indicating that the mobile identity information for the MS 104 was successfully received and handled, as determined in decision block 722, the received registration request or other message is forwarded to the UNC 116 in block 724. If, however, the "success" message has not been received, as determined in decision block 722, the UNC-SGW 106 will queue the registration request or other message in block 726 until such time as the UNC-SGW 106 receives the "success" message. Alternatively, the UNC-SGW 106 can delay the TCP connection acknowledgement message to the MS 104 in block 730. If a message has been received from the UNC 116 indicating that the mobile identity information for the MS 104 was successfully received and handled, as determined in decision block 732, the received registration request or other message is forwarded to the UNC 116 in block 734. If, however, the "success" message has not been received, as determined in decision block 732, the UNC-SGW 106 will queue the registration request or other message in block 736 until such time as the UNC-SGW 106 receives the "success" message.

Referring now to FIG. 8, a flow chart depicting a method in accordance with one embodiment of the present invention as it used at an UNC or GANC 116 is shown. The UNC or GANC 116 listens for incoming TCP connections on TCP port(s) that are defined in both the UNCs or GANCs 116 and the UNC-SGWs or GANC-SEGWs 106 in block 800. A TCP connection is established with the MS 104 using the defined port(s) and IPsec tunnel in block 802. The UNC or GANC 116 then stores the private IP address for the MS 104 and associates it with the MS 104 in block 804 and the mobile identity information for the MS 104 is received from the UNC-SGW or GANC-SEGW 106 in block 806. The received MS mobile identity information is stored and associated with the previously stored MS private IP address in block 808. A registration request containing IMSI for the MS 104 is then received from the MS 104 in block 810. If the received IMSI matches the stored IMSI, as determined in decision block 812, the MS 104 is registered in block 814. If, however, the received IMSI does match (or is not found) the stored IMSI, as determined in decision block 812, the registration request is rejected in block 816.

Note that there are other solutions to some of the problems addressed by the present invention. For example, a "log connection" can be established by the UNC or GANC 116. The problem with this solution is that the UNC or GANC 116 doesn't know which UNC-SGW or GANC-SEGW 106 is used by a particular MS 104. The UNC or GANC 116 only sees the private IP-address of the MS 104. Each UNC or GANC 104 could be configured with the associations between private IP-address subnetworks and UNC-SGWs or GANC-SEGWs 106. In some scenarios, when multiple UNC-SGWs or GANC-SEGWs 106 are using the same DHCP server, this gets very cumbersome. Another solution would be to define all the UNC-SGWs or GANC-SEGWs 106 in each UNC or GANC 116 and when the UNC or GANC 116 receives a registration request, it could ask all UNC-SGWs or GANC-SEGWs 106 about the needed information. This means a lot of configuration of UNC-SGW or GANC-SEGW 106 information in all the UNCs or GANCs 116 and it also means that the load on the UMA system will increase as every UNC-SGW or GANC-SEGW 106 is requested at every MS 104 registration.

Still another possibility would be to use existing "log-function" in SGWs or GANCs 106. This means that the needed information is added to the SGW or SEGW "log-function". The problem with this solution is that normally this "log-function" is using unreliable UDP-protocol. Futhermore, the SGW or SEGW "log" function is normally sent to a few network hosts and it would need to be further sent to different UNCs or GANCs 116.

The present invention can also be expanded to check all application level messages between the MS 104 and the UNC or GANC 116. The UNC-SGW or GANC-SEGW 106 could perform layer violations and sneak into the registration request message sent by the MS 104, read out the IMSI-value and compare this to the IMSI used at EAP-SIM or EAP-AKA authentication. If IMSI-values match, the UNC-SGW or GANC-SEGW 106 can forward the message towards the UNC or GANC 104. If no-match, then the UNC-SGW or GANC-SEGW 106 can release the IPsec connection towards the MS 104, blacklist the IMSI or MS public IP-address and the UNC-SGW or GANC-SEGW 106 could also inform AAA-server 114 about the hostile MS IMSI. This solution is also quite simple, but it doesn't solve the problem of providing the MS public IP-address to the UNC or GANC 116. It also means that the UNC-SGW or GANC-SEGW 106 should check all the application level messages sent by the MSs 104 and should have certain knowledge about the application level protocol, which is not desired. This would also add a certain load to the UNC-SGW or GANC-SEGW 106.

Now referring to FIG. 9, a signaling sequence 900 depicting the use of one embodiment of the present invention with respect to uplink messages 902 and 906 is shown. When the UNC or GANC 116 receives an uplink message 902 containing a mobile identity, the UNC or GANC 116 stores 904 the MS identity. This uplink message 902 is the previously described message containing the mobile identity information (e.g., MS IMSI, MS private IP address, MS public IP address and SGW or SEGW public address). When the UNC or GANC 116 receives an uplink message 906 containing a mobile identity, the UNC or GANC 116 checks 908 the mobile identity. If the uplink message 906 is a registration request (i.e., a new MS 104), and the check 908 fails—the received mobile identity does not match the stored mobile identity associated with the MS 104 or it is not found—the registration request 906 is rejected. If, however, the check 908 passes—the received mobile identity matches the stored mobile identity associated with the MS 104—the UNC or GANC 116 processes the message 906 (e.g., registers MS 104). If the message 906 is another type of message, and the check 908 fails—the received mobile identity does not match the stored mobile identity associated with the MS 104—the message 302 is dropped. If, however, the check 908 passes—the received mobile identity matches the stored mobile identity associated with the MS 104—or the mobile identity is undetectable, the UNC or GANC 116 processes the message 906 (e.g., forwards message 910). The mobile identity may be undetectable in some of the GMM-messages GPRS Mobility Management (GMM) messages between the MS 104 and the SGSN because they can be sent ciphered on LLC-layer and the UNC or GANC 116 cannot easily sneak into these messages. For example, the ROUTING AREA UPDATE REQUEST message is normally sent unciphered and the UNC or GANC 116 can perform checks on this message.

More specifically, if the uplink message 906 contains an IMSI, then the UNC or GANC 116 checks that this IMSI is the same as the one provided by the MS 104 during registration. If it is the same, then the message 910 is forwarded to the core network. If it is different, the message is dropped. The UNC or GANC 116 may also deregister the MS 104 and black list temporarily the IP address used by the MS 104. Other actions may include notifying the operator with an alarm and logging the event.

If the uplink message 906 contains a TMSI or a P-TMSI and the UNC or GANC 116 has not stored a TMSI or P-TMSI for this MS 104, the TMSI or P-TMSI is stored in the MS 104 context. If, however, the UNC or GANC 116 has already stored a TMSI or P-TMSI for this MS 104, the UNC or GANC 116 checks that these TMSI values are the same. If they are same, the message 910 is forwarded to the core network. If they are different, the message is dropped. The UNC or GANC 116 may also deregister the MS 104 and black list temporarily the IP address used by the MS 104. Other actions may include notifying the operator with an alarm and logging the event.

Referring now to FIG. 10, a signaling sequence 1000 depicting the use of one embodiment of the present invention with respect to downlink messages 1002 is shown. When the UNC or GANC 116 receives a downlink message 1002 containing a mobile identity, the UNC or GANC 116 checks 1004 the mobile identity. If the downlink message 1002 contains a new mobile identity (newly assigned or changed) for a MS 104, the UNC or GANC 116 will store the received mobile identity and associate it with the MS 104, and process the received message (i.e., forward the message 1006 to the MS 104). If the check 1004 reveals that the mobile identity has already been stored (e.g., already exists) for the MS 104, the received message is processed (i.e., forward the message 1006 to the MS 104). Alternatively, the mobile identity can be held and not stored until an uplink message is received that accepts, acknowledges or completes the downlink message 1002.

For example, if a downlink message 1002 is a TMSI REALLOCATION COMMAND, then the UNC or GANC 116 stores the assigned TMSI value in the MS 104 context. Downlink messages are received on a signaling connection that is associated with the MS 104 context. The storing of the TMSI to the MS 104 context could also be delayed until a TMSI REALLOCATION COMPLETE message is received from the MS 104. Likewise, if the downlink message 1002 is a LOCATION UPDATING ACCEPT and a new TMSI is assigned to the MS 104, then the UNC or GANC 116 stores the assigned TMSI value in the MS 104 context. The storing of the TMSI to the MS 104 context could also be delayed until a TMSI REALLOCATION COMPLETE message is received from the MS 104. The process for a P-TMSI REALLOCATION COMMAND is handled the same way.

Figure 11:
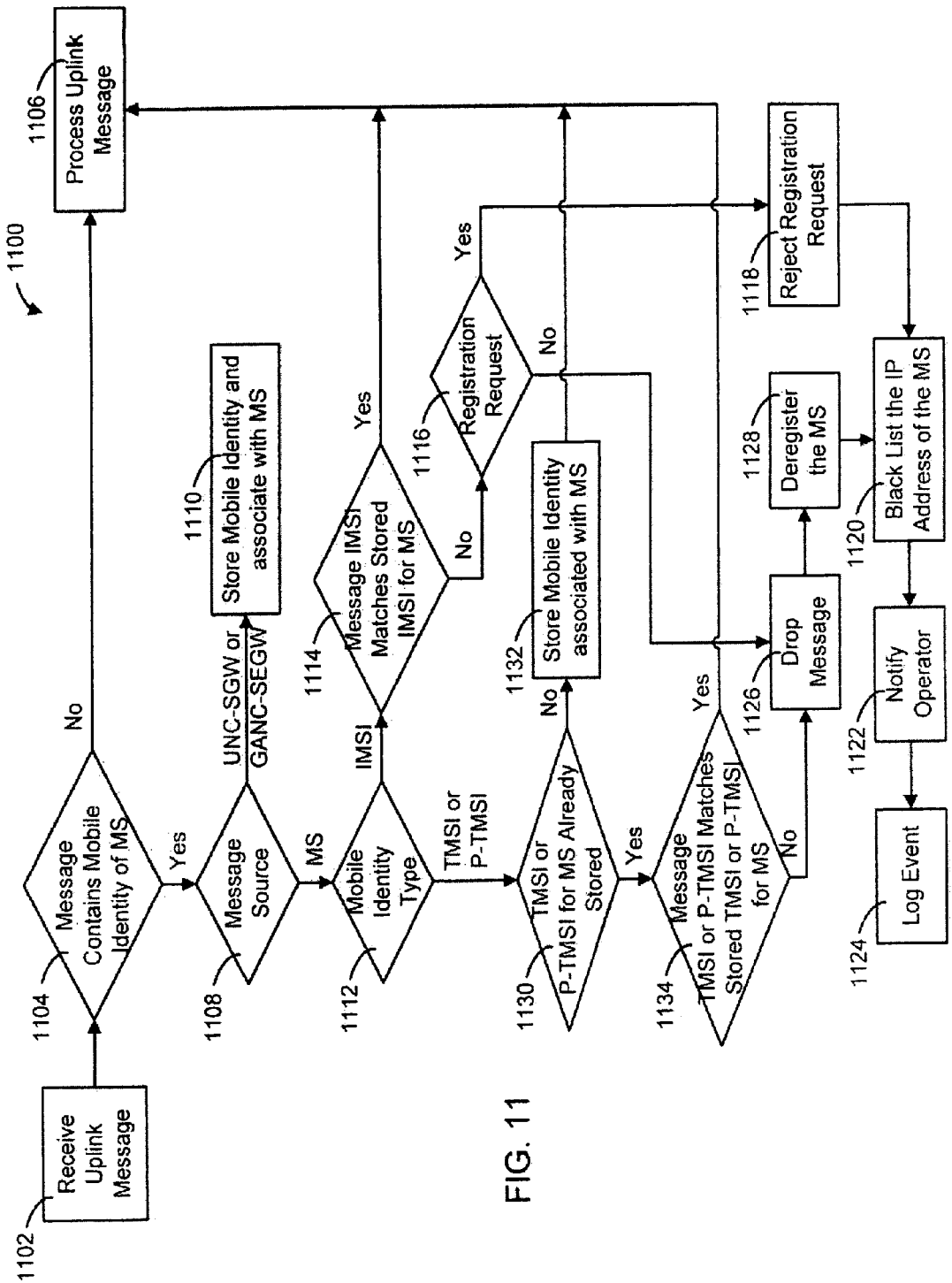
FIG. 11 is a flow chart depicting a method in accordance with one embodiment of the present invention with respect to uplink messages.

Now referring to FIG. 11, a flow chart depicting a method 1100 in accordance with one embodiment of the present invention with respect to uplink messages is shown. A uplink message is received in block 1102. If the received message does not contain a mobile identity of the MS (or is undetectable), as determined in decision block 1104, the uplink message is processed in block 1106 (e.g., forwarded, executed, etc.). If, however, the uplink message contains a mobile identity of the MS, as determined in decision block 1104, and the message source is the UNC-SGW or GANC-SEGW 106, as determined in decision block 1108, the mobile identity information is stored and associated with the MS 104 in block 1110. If, however, the message source is the MS 104, as determined in decision block 1108, and the mobile identity is an IMSI, as determined in decision block 1112, and the received IMSI matches the stored IMSI associated with the MS, as determined in decision block 1114, the message is processed normally in block 1106. If, however, the received IMSI does not match the stored IMSI associated with the MS, as determined in decision block 1114, and the uplink message is a registration request, as determined in decision block 1116, the IMSI is registration request is rejected in block 1118. The UNC or GANC 116 may also perform any or all of the following actions: black list the IP address associated with the MS 104 for a period of time in block 1120; notify a system operator of the dropped message and deregistration of the mobile station in block 1122; or log information about the dropped message and deregistration of the mobile station in block 1124. If, however, the uplink message is not a registration request, as determined in decision block 1116, the message is dropped in block 1126. The UNC or GANC 116 may also perform any or all of the following actions: deregister the MS in block 1128; black list the IP address associated with the MS 104 for a period of time in block 1120; notify a system operator of the dropped message and deregistration of the MS 104 in block 1122; or log information about the dropped message and deregistration of the MS 104 in block 1124.

If, however, the mobile identity is a TMSI or P-TMSI, as determined in decision block 1112, and a TMSI or P-TMSI has not already been stored for the MS 104, as determined in decision block 1130, the TMSI or P-TMSI is stored and associated with the MS 104 in block 1132 and the message is processed normally in block 1106. If, however, a TMSI or P-TMSI has already been stored for the MS 104, as determined in decision block 1130, and the received TMSI or P-TMSI matches the stored TMSI or P-TMSI associated with the MS 104, as determined in decision block 1134, the message is processed normally in block 1106. If, however, the received TMSI or P-TMSI does not match the stored TMSI or P-TMSI associated with the MS 104, as determined in decision block 1134, the message is dropped in block 1126. The UNC or GANC 116 may also perform any or all of the following actions: deregister the MS 104 in block 1128; black list the IP address associated with the MS 104 for a period of time in block 1120; notify a system operator of the dropped message and deregistration of the MS 104 in block 1122; or log information about the dropped message and deregistration of the MS 104 in block 1124.

Figure 12:
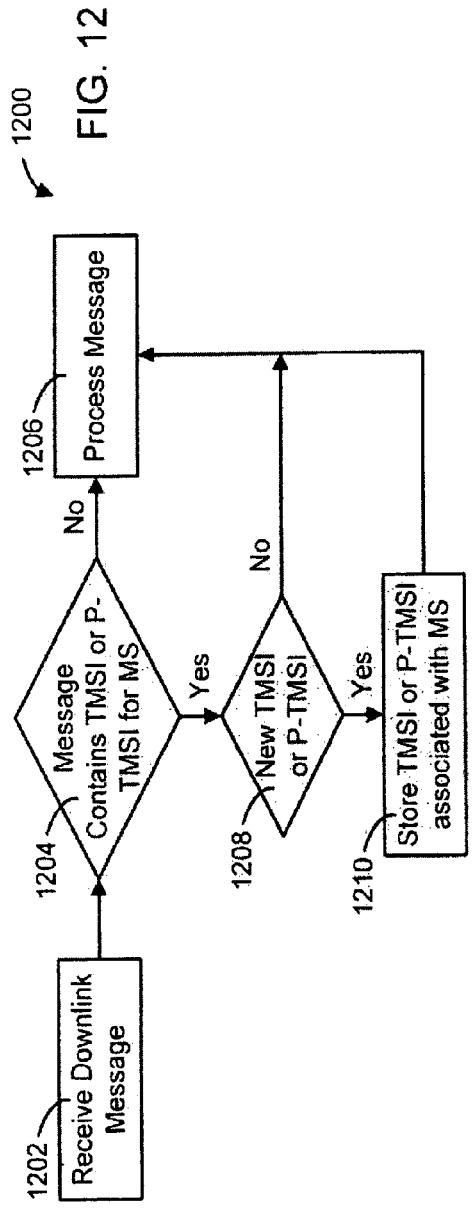
FIG. 12 is a flow chart depicting a method in accordance with one embodiment of the present invention with respect to downlink messages.

Referring now to FIG. 12, a flow chart depicting a method 1200 in accordance with one embodiment of the present invention with respect to downlink messages is shown. A downlink message is received in block 1202. If the downlink message does not contain a TMSI or P-TMSI for the MS 104 (or is undetectable), as determined in decision block 1204, the downlink message is processed in block 1206 (e.g., forwarded, executed, etc.). If, however, the downlink message contains a TMSI or P-TMSI for the MS 104, as determined in decision block 1204, and the TMSI or P-TMSI is not new (i.e., the UNC or GANC 116 has already stored and associated it with the MS 104), as determined in decision block 1208, the downlink message is processed normally in block 1206. If, however, the TMSI or P-TMSI is new, as determined in decision block 1208, the TMSI or P-TMSI is stored and associated with the MS 104 in block 1210 and the message is processed normally in block 1206.

Figure 13:
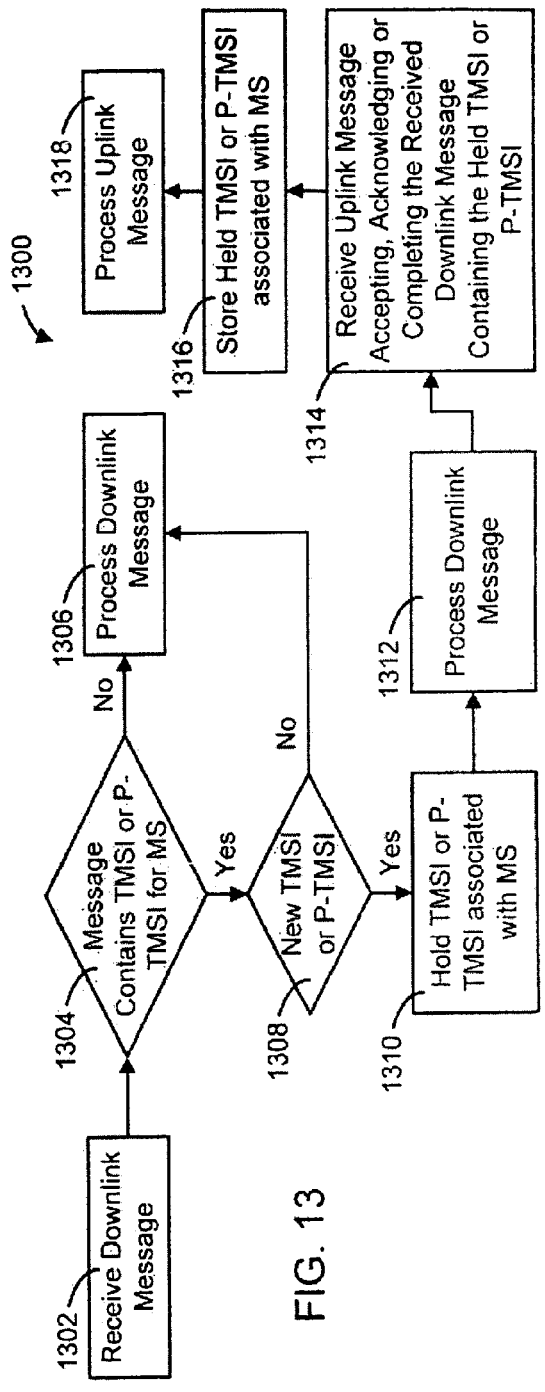
FIG. 13 is a flow chart depicting a method in accordance with another embodiment of the present invention with respect to downlink messages.

Now referring to FIG. 13, a flow chart depicting a method 1300 in accordance with another embodiment of the present invention with respect to downlink messages is shown. A downlink message is received in block 1302. If the downlink message does not contain a TMSI or P-TMSI for the MS 104 (or is undetectable), as determined in decision block 1304, the downlink message is processed in block 1306 (e.g., forwarded, executed, etc.). If, however, the downlink message contains a TMSI or P-TMSI for the MS 104, as determined in decision block 1304, and the TMSI or P-TMSI is not new (i.e., the UNC or GANC 116 has already stored and associated it with the MS 104), as determined in decision block 1308, the downlink message is processed normally in block 1306. If, however, the TMSI is new, as determined in decision block 1308, the TMSI or P-TMSI is held in block 1310 and the message is processed normally in block 1312. The TMSI or P-TMSI is held until an uplink message is received that accepts, acknowledges or completes the received downlink message containing the held TMSI or P-TMSI in block 1314. Thereafter, the held TMSI or P-TMSI is stored and associated with the MS 104 in block 1316 and the uplink message is processed normally in block 1318.

Note that any of the above-described methods can be implemented as a computer program embodied on a computer readable medium wherein the various method steps are implemented by one or more code segments.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for providing security in an unlicensed mobile access network, the method comprising the steps of:
   receiving a message containing a mobile identity of a mobile station at a secure gateway in the unlicensed mobile access network;
   the secure gateway holding the received message until a success message is received from an unlicensed network controller, associated with the unlicensed mobile access network, the success message indicating successful receipt and storage of the mobile identity information; and
   the secure gateway dropping or rejecting the message whenever the received mobile identity does not match a stored mobile identity associated with the mobile station, wherein dropping the received message further comprises:
   deregistering the mobile station
   blacklisting an Internet Protocol (IP) address associated with the mobile station for a period of time;
   notifying a system operator of the dropped message and deregistration of the mobile station; or
   logging information about the dropped message and deregistration of the mobile station.

2. The method as claimed in claim 1, further comprising the step of processing the received message whenever the received mobile identity matches the stored mobile identity associated with the mobile station.

3. The method as claimed in claim 1, wherein the mobile identity comprises an International Mobile Subscriber Identity (IMSI), a Temporary Mobile Subscriber Identity (TMSI), a Packet Temporary Mobile Subscriber Identity (P-TMSI), private Internet Protocol (IP) address or a public IP address.

4. The method as claimed in claim 1, wherein the received message comprises a registration request, an uplink message or a downlink message.

5. The method as claimed in claim 4, wherein the uplink message is received from a mobile switching center (MSC) or a General Packet Radio Service (GPRS) support node (SGSN).

6. The method as claimed in claim 1, further comprising the step of storing the received mobile identity whenever the received message is from the secure gateway.

7. The method as claimed in claim 1, further comprising the step of storing the received mobile identity and processing the received message whenever the received message is a down link message and the received mobile identity will assign or change the mobile identity of the mobile station.

8. The method as claimed in claim 7, wherein the received mobile identity is not stored until an uplink message is received that accepts, acknowledges or completes the downlink message.

9. The method as claimed in claim 1, wherein the received message is Mobility Management (MM) message, a General Packet Radio Service (GPRS) Mobility Management (GMM) message, or a UMA or Unlicensed Radio Resources (URR) message.

10. The method as claimed in claim 1, wherein the message is received at the unlicensed network controller (UNC) within the unlicensed mobile access network (UMAN) or a generic access network controller (GANC) within a generic access network (GAN).

11. The method as recited in claim 1, further comprising the step of using the stored mobile identity to provide one or more services to the mobile station.

12. An apparatus in an unlicensed mobile access network, the apparatus comprising:
    an unlicensed network controller;
    a data storage device that stores associations of mobile identities to mobile stations;
    a secure gateway for receiving a message containing a mobile identity of a mobile station, wherein the secure gateway includes means for holding the registration request until a success message is received from the network controller indicating successful receipt and storage of the mobility identity information; and
    a processor communicably coupled to the data storage device that receives the mobile identity of a mobile station and drops or rejects the message whenever the received mobile identity does not match a stored mobile identity associated with the mobile station, wherein the dropping or rejecting the message further comprises:
    deregistering the mobile station;
    blacklisting an Internet Protocol (IP) address associated with the mobile station for a period of time;
    notifying a system operator of the dropped message and deregistration of the mobile station; or
    logging information about the dropped message and deregistration of the mobile station.

13. A system in an unlicensed mobile access network, the system comprising:
    a mobile station;
    a secure gateway communicably coupled to the mobile station that receives a message containing mobile identity information from the mobile station and holds the message until a success message is received from an unlicensed controller indicating successful receipt and storage of the mobile identity information wherein the secure gateway sends the mobile identity information to an unlicensed network controller;
    and
    the network controller being communicably coupled to the mobile station and the secure gateway, wherein the network controller stores the received mobile identity information and registers the mobile station whenever the mobile identity information within a registration request received from the mobile station matches the stored mobile identity information, wherein the network controller drops a message received from the mobile station whenever the message contains a mobile identity that does not match the stored mobile identity information.

14. The system as recited in claim 13, wherein the mobile identity information comprises an International Mobile Subscriber Identity (IMSI), a private Internet Protocol (IP) address, or a public IP address.

15. The system as recited in claim 13, wherein the secure gateway is configured with one or more defined Transmission Control Protocol (TCP) ports used by the network controller to register the mobile station, and the network controller listens for an incoming TCP connection on the one or more defined TCP ports.

16. The system as recited in claim 13, wherein the network controller uses the mobile identity information to provide one or more services to the mobile station.

* * * * *

UNITED STATES PATENT AND TRADEMARK OFFICE
CERTIFICATE OF CORRECTION

| | |
|---|---|
| PATENT NO. | : 7,280,826 B2 |
| APPLICATION NO. | : 11/047880 |
| DATED | : October 9, 2007 |
| INVENTOR(S) | : Tomas Nylander et al. |

It is certified that error appears in the above-identified patent and that said Letters Patent is hereby corrected as shown below:

In Column 6, Line 14, delete "connection"new" and insert -- connection"/new --, therefor.

Signed and Sealed this

Twenty-fourth Day of June, 2008

JON W. DUDAS
*Director of the United States Patent and Trademark Office*